(12) United States Patent
Iuhas et al.

(10) Patent No.: US 12,458,917 B2
(45) Date of Patent: Nov. 4, 2025

(54) SYSTEM FOR RECOVERING METHANE FROM A BIOGAS

(71) Applicant: XEBEC ADSORPTION INC., Blainville (CA)

(72) Inventors: Cristian Stefan Iuhas, Blainville (CA); Richard Peter Glynn Jewell, Blainville (CA); Alberto Torres, Blainville (CA); Babak Shirani, Blainville (CA)

(73) Assignee: IVYS ADSORPTION INC., Blainville (CA)

( * ) Notice: Subject to any disclaimer, the term of this patent is extended or adjusted under 35 U.S.C. 154(b) by 339 days.

(21) Appl. No.: 18/251,433

(22) PCT Filed: Nov. 2, 2021

(86) PCT No.: PCT/CA2021/051554
§ 371 (c)(1),
(2) Date: May 2, 2023

(87) PCT Pub. No.: WO2022/087755
PCT Pub. Date: May 5, 2022

(65) Prior Publication Data
US 2024/0189760 A1 Jun. 13, 2024

Related U.S. Application Data

(60) Provisional application No. 63/108,769, filed on Nov. 2, 2020.

(51) Int. Cl.
*B01D 53/22* (2006.01)
*B01D 53/047* (2006.01)
*C10L 3/10* (2006.01)

(52) U.S. Cl.
CPC ............ *B01D 53/047* (2013.01); *C10L 3/103* (2013.01); *C10L 3/104* (2013.01); *C10L 3/106* (2013.01);
(Continued)

(58) Field of Classification Search
CPC ............ B01D 53/047; B01D 2256/245; B01D 2257/504; B01D 2258/05; C10L 3/103; C10L 3/104; C10L 3/106
See application file for complete search history.

(56) References Cited

U.S. PATENT DOCUMENTS 5,352,272 A * 10/1994 Moll ...................... B01D 53/22
96/9
5,837,032 A * 11/1998 Moll .................. B01D 71/5222
95/52
(Continued)

OTHER PUBLICATIONS

International Search Report and Written Opinion issued in corresponding International application No. PCT/CA2021/051554 on Feb. 4, 2022.

*Primary Examiner* — Anthony R Shumate
(74) *Attorney, Agent, or Firm* — BCF LLP

(57) ABSTRACT

A system for recovering methane from a biogas comprises a pressure swing adsorption (PSA) unit, a biogas inlet, a gas mixer and a surge tank. The PSA unit recovers methane from the biogas and directs one fraction of the recovered methane toward a product gas outlet. The PSA unit directs another fraction of the recovered methane toward a recycling line and directs remaining gases to an exhaust. The biogas inlet receives biogas from a biogas source. The gas mixer is fluidly connected to the biogas inlet, to the recycling line and to the PSA unit, forms a combination of the biogas received at the biogas inlet and of the recycled methane, and supplies the combination to the PSA unit for methane recovery. The surge tank is in one of the recycling line or in an exhaust line and reduces a pressure in the PSA unit to improve methane recovery efficiency.

20 Claims, 15 Drawing Sheets

(52) U.S. Cl.
CPC .. *B01D 2256/245* (2013.01); *B01D 2257/504* (2013.01); *B01D 2258/05* (2013.01)

(56) References Cited

U.S. PATENT DOCUMENTS

| | | | |
|---|---|---|---|
| 7,645,324 B2* | 1/2010 | Rode | B01J 20/28052 |
| | | | 95/96 |
| 2010/0213083 A1* | 8/2010 | Olander | F17C 11/00 |
| | | | 222/6 |
| 2011/0290109 A1* | 12/2011 | Khiavi | B01D 53/0473 |
| | | | 96/115 |
| 2014/0045248 A1* | 2/2014 | Wallace | C01B 19/02 |
| | | | 422/187 |
| 2014/0331862 A1* | 11/2014 | Cullinane | B01D 53/1406 |
| | | | 95/219 |
| 2015/0352463 A1* | 12/2015 | Grave | C10L 3/106 |
| | | | 261/84 |
| 2016/0199774 A1* | 7/2016 | Grave | C10L 3/103 |
| | | | 95/149 |
| 2018/0079672 A1 | 3/2018 | Meyer et al. | |
| 2018/0135004 A1* | 5/2018 | Bradin | C12P 5/023 |
| 2023/0347277 A1* | 11/2023 | Manghootaee | C07C 7/12 |
| 2024/0018082 A1* | 1/2024 | Stevic | C25B 15/081 |
| 2025/0001351 A1* | 1/2025 | Foody | C07C 7/12 |

\* cited by examiner

SYSTEM FOR RECOVERING METHANE FROM A BIOGAS

CROSS-REFERENCE

The present application is a National Phase Entry of international PCT patent application No. PCT/CA2021/051554 filed on Nov. 2, 2021 and claims priority from U.S. Provisional Patent Application Ser. No. 63/108,769, filed on Nov. 2, 2020, the content of the above noted applications is incorporated herein by reference in its entirety.

TECHNICAL FIELD

The present disclosure relates to the field of biogas processing. More specifically, the present disclosure relates to a system for recovering methane from a biogas.

BACKGROUND

Adsorptive separation systems are commonly used for separation of gas streams comprising multiple gas components. Pressure swing, temperature swing, and partial pressure swing or displacement purge adsorption processes are used for performing such separations of multi-component gas mixtures. Recent advances in adsorptive separation technologies include the use of vacuum assisted desorption during regeneration. For example, an adsorptive gas separation process is described in U.S. Pat. No. 7,828,877 to Sawada et al., issued on Nov. 9, 2010 (hereinafter "Sawada"), the disclosure of which is incorporated by reference herein.

In particular, methane extraction from biogas is of particular interest for economic and environmental reasons.

FIG. 1 (Prior Art) is an example of a 6-bed pressure swing adsorption (PSA) cycle showing a single common adsorber pressure profile. On FIG. 1, a graph illustrates a relative pressure as a function of a phase angle. In this context, the "phase angle" of a PSA valve cycle is employed to divide the progress of one complete cycle into 360 degrees to be able to determine the implementation of each individual operation during the cycle. In more details, FIG. 1 illustrates a non-limiting example of a PSA adsorber pressure profile suitable for adaptation of Sawada's adsorptive separation processes to a 6-bed PSA device for the purification of a methane product gas by PSA from a feed gas mixture comprising at least methane and carbon dioxide components. The relative pressure levels of various stages of the shown PSA cycle for a single PSA adsorber bed, or vessel, are shown against the progressive phase of the cycle, wherein the progressive phase of the 6-adsorber PSA cycle are represented as 12 sub-operations. Sawada's pressure cycle comprises a number of depressurization operations and a number of re-pressurization operations, for example three or four each depending on the number of beds in the PSA device. Sawada's pressure cycle also comprises both a supply purge stream and a product purge stream in order to desirably increase the recovery of methane in the purified methane product gas, relative to some simpler PSA cycles that may employ product purge alone to regenerate the adsorbent materials.

Other advances are described in U.S. Provisional Patent Application Ser. No. 62/959,697 to Iuhas et al., filed on Jan. 10, 2020 (hereinafter "Iuhas'697"), in U.S. Provisional Patent Application Ser. No. 63/085,029 to Iuhas et al., filed on Sep. 29, 2020 (hereinafter "Iuhas'029"), and in International Patent Application Serial No. PCT/CA2021/050012 to Iuhas et al., filed on Jan. 10, 2021 (hereinafter "Iuhas'012"), the disclosure of all of which being incorporated by reference herein. Iuhas'697, Iuhas'029 and Iuhas'012 describe a system for processing biogas, the system comprising a container and a PSA unit housed in the container. The PSA unit includes a rotary valve for distributing flow of the biogas in the PSA unit.

In spite of the advances introduced in Sawada, in Iuhas'697, in Iuhas'039 and in Iuhas'012, advances are still required in methane recovery technologies. For example, it has been observed that gas flow restrictions in pipelines delivering biogas to processing systems using PSA cycles cause pressure restrictions in PSA beds and increase the time required for the pressure to fall to a desired level. Such pressure restrictions are detrimental to methane recovery performance. Flows in such pipelines commonly reach supersonic speeds, resulting in flow rate limitations. In turn, flow rate limitations lead to a lack of a sufficient drop in pressure in the PSA beds in the time allotted in the PSA pressure cycle. The high pressure in the PSA beds reduces the capability of the PSA beds to evacuate the methane from the PSA beds and to desorb all of the methane from the adsorbent. Not achieving the required pressure in the required time has a negative impact on the recovery of methane, leads to an increased number of PSA cycles, with a corresponding increase of energy required for methane recovery, and results in increases of wasted methane improperly expelled in the atmosphere from biogas processing systems. A typical methane recovery of 60 to 80% offered by conventional biogas processing systems is deemed unacceptable, especially considering that methane is a very powerful greenhouse gas.

High methane concentrations in exhausted from biogas processing systems and greenhouse gas emission considerations result in there being a need to reduce the emissions of methane to the atmosphere. In such biogas processing systems, a high methane content in the exhaust would not be acceptable and would impact the greenhouse gas life cycle analysis factors for the process and the product gas. There is thus a need to better recuperate the methane from the biogas in fewer PSA cycles and to expel less methane in the exhaust gas stream before it is released into the environment.

Therefore, there is a need for improvements allowing to increase the methane recovery from biogases.

SUMMARY

According to the present disclosure, there is provided a system for recovering methane from a biogas, comprising: a first pressure swing adsorption (PSA) unit adapted to: recover methane from the biogas, direct a first fraction of the recovered methane from a first outlet of the first PSA unit toward a product gas outlet, direct a second fraction of the recovered methane from a second outlet of first the PSA unit toward a recycling line, and direct a remainder of the biogas from a third outlet of the first PSA unit toward an exhaust; a biogas inlet fluidly connected to a biogas source; a gas mixer fluidly connected to the biogas inlet, to the recycling line and to the first PSA unit, the gas mixer being adapted to: form a combination of biogas received at the biogas inlet and of the second fraction of the recovered methane, and supply the combination to the first PSA unit for methane recovery; and a surge tank within the recycling line, the surge tank having an inlet fluidly connected to the second outlet of the first PSA unit, the surge tank further having an outlet fluidly connected to an inlet of the gas mixer, the surge tank being operative to cause a pressure reduction at the second outlet of the first PSA unit and to deliver the second fraction of the recovered methane to the inlet of the gas mixer.

In some embodiments of the present technology, the system further comprises a second PSA unit adapted to: perform an initial recovery of methane from the biogas; direct the methane resulting from the initial recovery from a first outlet of the second PSA unit toward the recycling line; and direct a remainder of the biogas from which the methane is initially recovered from a second outlet of the second PSA unit to the exhaust.

In some embodiments of the present technology, the inlet of the surge tank is further fluidly connected to the first outlet of the second PSA unit; and the surge tank is further operative cause a pressure reduction at the first outlet of the second PSA unit and to deliver the recovered methane recovered by the second PSA unit to the inlet of the gas mixer.

In some embodiments of the present technology, the system further comprises a first pressure boost device positioned downstream of the surge tank in the recycling line, the first pressure boost device being operative to decrease a pressure at the second outlet of the first PSA and to increase a pressure of the remainder of the biogas for delivery to the inlet of the gas mixer.

In some embodiments of the present technology, the first pressure boost device is selected from a vacuum blower and a pressure boost pump.

In some embodiments of the present technology, the system further comprises an exhaust surge tank fluidly connected to the third outlet of the first PSA unit, the exhaust surge tank being operative to cause a pressure reduction at the third outlet of the first PSA unit.

In some embodiments of the present technology, the system further comprises a second pressure boost device fluidly connecting the exhaust surge tank to the exhaust, the second pressure boost device being operative to increase a pressure at the exhaust.

In some embodiments of the present technology, the second pressure boost device is selected from a vacuum blower and a pressure boost pump.

In some embodiments of the present technology, the gas mixer comprises a biogas blower fluidly connected to the recycling line, to the biogas inlet and to the first PSA unit.

In some embodiments of the present technology, the system further comprises a biogas blower fluidly connected to the recycling line, to the biogas inlet and to the first PSA unit; the gas mixer comprising a manifold fluidly connected to the recycling line, to the biogas inlet and to the biogas blower.

In some embodiments of the present technology, the system further comprises a water-removal unit adapted to receive the biogas from the biogas inlet and to provide a dry biogas to the gas mixer; a polishing device adapted to receive the dry biogas from the gas mixer and to remove hydrogen sulfide therefrom; and a compressor adapted to receive the dry biogas from the polishing device and to supply the dry biogas to an inlet of the first PSA unit.

In some embodiments of the present technology, the compressor is further adapted to extract remaining water from the dry biogas and to direct the extracted water toward a liquid condensate outlet.

In some embodiments of the present technology, the system further comprises a refrigeration unit thermally connected to the water-removal unit and to the compressor, the refrigeration unit being adapted to cause condensation of water contained in the biogas and to cause the condensed water to be directed toward the liquid condensate outlet.

In some embodiments of the present technology, the surge tank comprises a plurality of cooperating surge tanks.

The present disclosure also provides a system for recovering methane from a biogas, comprising: a first pressure swing adsorption (PSA) unit adapted to: recover methane from the biogas, direct a first fraction of the recovered methane from a first outlet of the first PSA unit toward a product gas outlet, direct a second fraction of the recovered methane from a second outlet of the first PSA unit toward a recycling line, and direct a remainder of the biogas from a third outlet of the first PSA unit toward an exhaust; a biogas inlet fluidly connected to a biogas source; a gas mixer fluidly connected to the biogas inlet, to the recycling line and to the first PSA unit, the gas mixer being adapted to: form a combination of biogas received at the biogas inlet and of the second fraction of the recovered methane, and supply the combination to the first PSA unit for methane recovery; and a surge tank having an inlet fluidly connected to the third outlet of the first PSA unit, the surge tank further having an outlet fluidly connected to the exhaust, the surge tank being operative to cause a pressure reduction at the third outlet of the first PSA unit.

In some embodiments of the present technology, the system further comprises a second PSA unit adapted to: perform an initial recovery of methane from the biogas; direct the methane resulting from the initial recovery from a first outlet of the second PSA unit toward the recycling line; and direct a remainder of the biogas from which the methane is initially recovered from a second outlet of the second PSA unit to the exhaust.

In some embodiments of the present technology, the gas mixer comprises a biogas blower fluidly connected to the recycling line, to the biogas inlet and to the first PSA unit.

In some embodiments of the present technology, the system further comprises a biogas blower fluidly connected to the recycling line, to the biogas inlet and to the first PSA unit; the gas mixer comprising a manifold fluidly connected to the recycling line, to the biogas inlet and to the biogas blower.

In some embodiments of the present technology, the system further comprises a water-removal unit adapted to receive the biogas from the biogas inlet and to provide a dry biogas to the gas mixer; a polishing device adapted to receive the dry biogas from the gas mixer and to remove hydrogen sulfide therefrom; and a compressor adapted to receive the dry biogas from the polishing device and to supply the dry biogas to an inlet of the first PSA unit.

In some embodiments of the present technology, the compressor is further adapted to extract remaining water from the dry biogas and to direct the extracted water toward a liquid condensate outlet.

In some embodiments of the present technology, the system further comprises a refrigeration unit thermally connected to the water-removal unit and to the compressor, the refrigeration unit being adapted to cause condensation of water contained in the biogas and to cause the condensed water to be directed toward the liquid condensate outlet.

In some embodiments of the present technology, the surge tank comprises a plurality of cooperating surge tanks.

The foregoing and other features will become more apparent upon reading of the following non-restrictive description of illustrative embodiments thereof, given by way of example only with reference to the accompanying drawings.

BRIEF DESCRIPTION OF THE DRAWINGS

Embodiments of the disclosure will be described by way of example only with reference to the accompanying drawings, in which.

Like numerals represent like features on the various drawings.

DETAILED DESCRIPTION

Various aspects of the present disclosure generally address one or more of the problems related to the limited methane recovery from biogases. An exhaust gas treatment removes methane from a biogas stream and recycles the collected methane into a biogas feed in order to improve methane recovery.

Generally speaking, the present technology improves earlier biogas extraction systems based on the pressure swing adsorption (PSA) cycle. In a PSA unit, beds (or vessels) are filled with layers of suitable adsorbent materials. Pressure reduction in the pressure swing cycle releases significant amounts of methane from the beds. This loss of methane negatively affects the overall methane recovery of the process. In particular, methane recovery performance is affected by voidage in the PSA beds. The voidage is caused by gas space created between the adsorbent particles. These voids are filled with biogas that contains significant amounts of methane. The methane concentration in the voidage increases along the length of the beds as carbon dioxide is removed from the biogas.

In an embodiment, a large volume is added in a recycling line between a PSA unit and an inlet of a biogas extraction system for recovering methane from biogas. The effect of the inclusion of the recycling line, and the effect of the inclusion of a surge tank in the recycling line, is to improve a flow of biogas in the recycling line and to improve a pressure swing within the system, resulting in an increase of an amount of methane being recycled by the system. Fewer cycles are needed within the biogas extraction system, and a lesser volume of need gas needs to be recycled, leading to a reduction of energy needed to process the biogas. The surge tank, combined with using an appropriately sized diameter for various piping within the system, allows a rapid depressurization at the top of the beds the PSA unit. Such rapid depressurization favors a high average flow rate of the biogas, resulting in an increase in the rate at which the PSA unit discharges methane contained in void spaces of the PSA beds, allowing a significant fraction of the methane to be recycled within the system and, in turn, to increase the methane recovery within the system.

Figure 2:
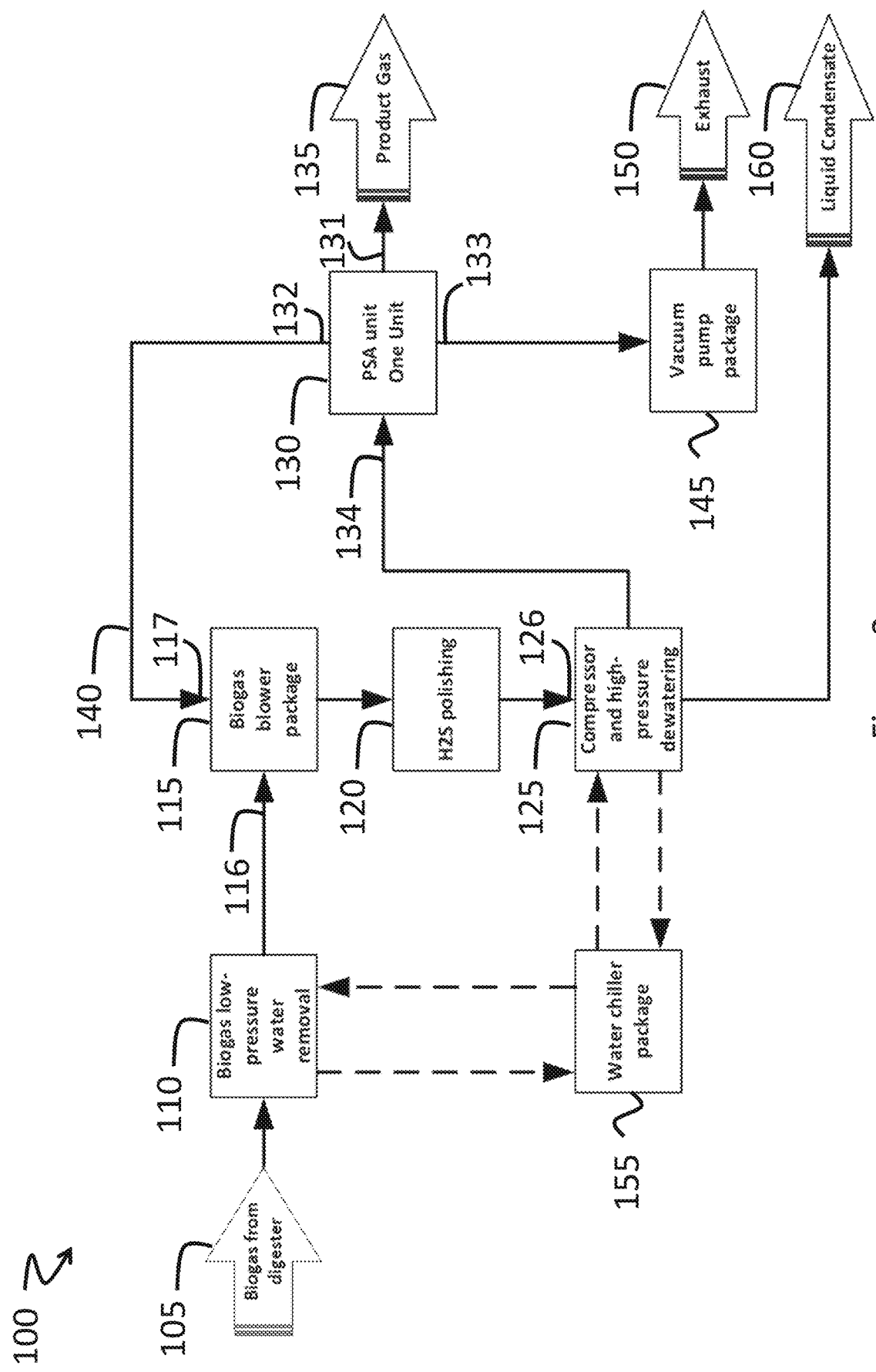
FIG. 2 is a schematic block diagram of a biogas upgrading system according to an embodiment of the present technology.

Referring now to the drawings, FIG. 2 is a schematic block diagram of a biogas upgrading system 100. Some of the components of the biogas upgrading system 100 as shown on FIG. 2 are optional. These components may be present in some embodiments and not in other embodiments. The illustration of FIG. 2 and the present description of the biogas upgrading system 100 are not intended to limit the scope of the present technology.

A biogas is received from a gas source, for example from a digester or from a landfill gas collection system, at a biogas inlet 105. Water contained in the biogas may be removed at least in part in a water-removal unit, for example a low-pressure water-removal apparatus 110. The biogas expelled from the low-pressure water-removal apparatus 110 may be characterized as a "dry biogas", with a water dewpoint between 3 and 6° C., although it may not entirely be free from any water content. The dry biogas is supplied to a first inlet of a mixer, which may for example comprise a biogas blower 115 or be integrated in such a blower. It is contemplated that the mixer may be distinct and separate from the biogas blower, the mixer receiving the dry biogas from the water-removal apparatus 110 and supplying the dry biogas to a first inlet 116 of the biogas blower 115. For example and without limitation, the mixer may be implemented as a manifold connecting a recycling line 140, the low-pressure water-removal apparatus 110 and the biogas blower 115.

The biogas blower 115 has a second inlet 117 as expressed hereinbelow. The dry biogas may then be fed to a polishing device 120 that removes hydrogen sulfide ($H_2S$) therefrom. A compressor 125 receives the dry biogas from the polishing device 120 and supplies compressed biogas to an inlet 134 of a PSA unit 130. In an embodiment, the PSA unit 130 may be a kinetic PSA unit. While FIG. 2 shows an embodiment of the biogas upgrading system 100 in which the polishing device 120 is located upstream of the compressor 125, the polishing device 120 may be located downstream of the compressor 125 in another embodiment. When positioned downstream of the compressor 125, the polishing device 120 may have a reduced tower vessel size.

The PSA unit 130 has three outlets. The PSA unit 130 extracts carbon dioxide from the biogas to recover methane from the biogas and directs a first fraction of the recovered methane, via a first outlet 131, toward a product gas outlet 135 of the biogas upgrading system 100, for storage in a reservoir (not shown) or for supply to a conduit such as a pipeline (not shown). This product essentially contains methane and may contain small fractions of other gases, for example carbon dioxide, nitrogen, water, as well as some amount of oxygen. A second fraction of the recovered methane is fed from a second outlet 132 of the PSA unit 130 to the second inlet 117 of the biogas blower 115 via the recycling line 140, for mixing with the biogas received at the biogas inlet 105. For example and without limitation, the second fraction of the recovered methane recycled from the second outlet 132 of the PSA unit may be in a range of 0 to 30% of the total of the recovered methane, for example in a range of 10 to 25% or in a range of 10 to 15%. It may be observed that a closed loop is formed between the second outlet 132 of the PSA unit 130, the recycling line 140, the second inlet 117 of biogas blower 115, the polishing device 120, the compressor 125 and the inlet 134 of the PSA unit 130. This continuous recycling of some of the recovered methane ameliorates the methane recovery process. Providing a sufficient diameter of the piping forming the recycling line 140 may allow to reduce a pressure at the second outlet 132 of the PSA unit 130, resulting in an increased pressure swing within the PSA unit 130 and a more efficient methane recovery.

A third outlet 133 of the PSA unit 130 is connected to a vacuum pump 145, which outputs gas that is substantially free of methane content, this gas being directed to an exhaust 150 of the biogas upgrading system 100. A major portion of the gas expelled at the exhaust 150 may consist of carbon dioxide.

A refrigeration unit, for example and without limitation a water chiller 155, may be thermally connected to both the low-pressure water-removal unit 110 and the compressor 125 for completing dewatering of the biogas received at the biogas inlet 105. The water chiller 155 provides a coolant solution in which a heat transfer fluid cools the biogas to a few degrees above freezing, to condense most of the water contained in the biogas. Water is expelled from the compressor 125 toward a liquid condensate outlet 160.

Experimental results obtained using the biogas upgrading system 100 have shown that the efficiency of methane recovery was about 80 to 86%, a significant improvement over the results obtained using conventional technology. However, this improvement is obtained at the expense of high volumes of methane being recycled in the recycling line 140 with a corresponding increase of energy consumption in the biogas extraction system 100.

Figure 3:
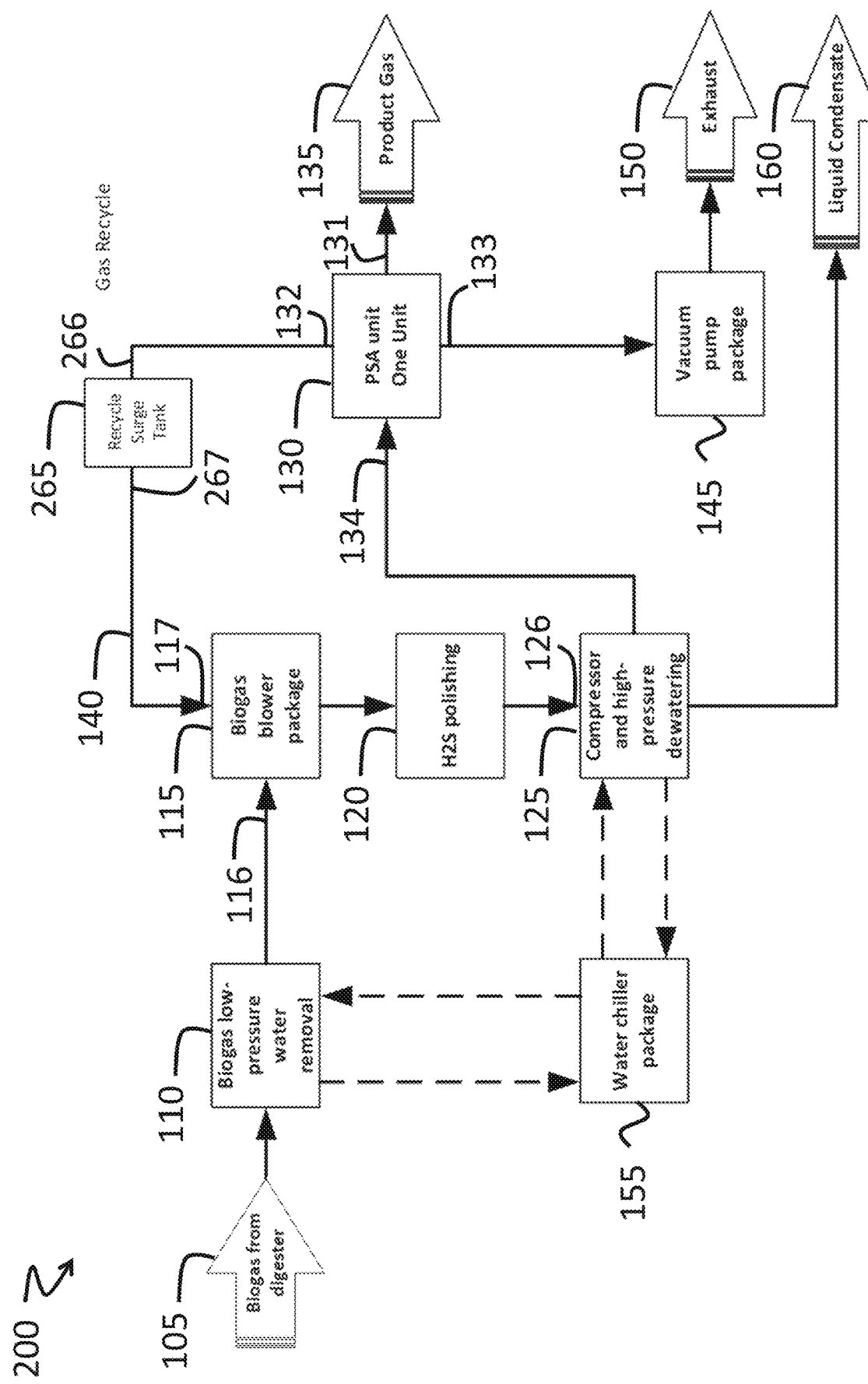
FIG. 3 is a schematic block diagram of a biogas upgrading system including a recycle surge tank according to an embodiment of the present technology.

FIG. 3 is a schematic block diagram of a biogas upgrading system 200 including a recycle surge tank 265. The biogas extraction system 200 is similar or identical to the biogas extraction system 100, with the exception that it adds a surge tank 265 within the recycling line 140. It is contemplated that a plurality of surge tanks 265 may be provided instead of the single surge tank 265 as shown. Reference is made herein to "a surge tank 265" in the singular form without limiting the generality of the present disclosure in order to simplify the illustration. The surge tank 265 has an inlet 266 fluidly connected to a first outlet 131 of the PSA unit 130 and an outlet 267 fluidly connected via the recycling line 140 to the second inlet 117 of the biogas blower package 115. The surge tank 265 allows to reduce a pressure at the second outlet 132 of the PSA unit 130 while increasing a fluid transfer rate for delivering the second fraction of the recovered methane to the second inlet 117 of the biogas blower package 115. In a non-limiting example, a volume of the surge tank 265 (or a volume of a plurality of surge tanks 265) may be on the order of 2 to 3 times, 2 to 4 times, or 2 to 6 times a combined volume of PSA beds of the PSA unit 130, in order to minimize a pressure variation within the recycling line 140. It has been observed that, when appropriately sized, the addition of the surge tank 265 in the biogas upgrading system 200 has reduced further the pressure at the second outlet 132 of the PSA unit 130, leading to an increased efficiency of recovery to about 86 to 98% when the biogas upgrading system 200 was used to recover methane.

Figure 4:
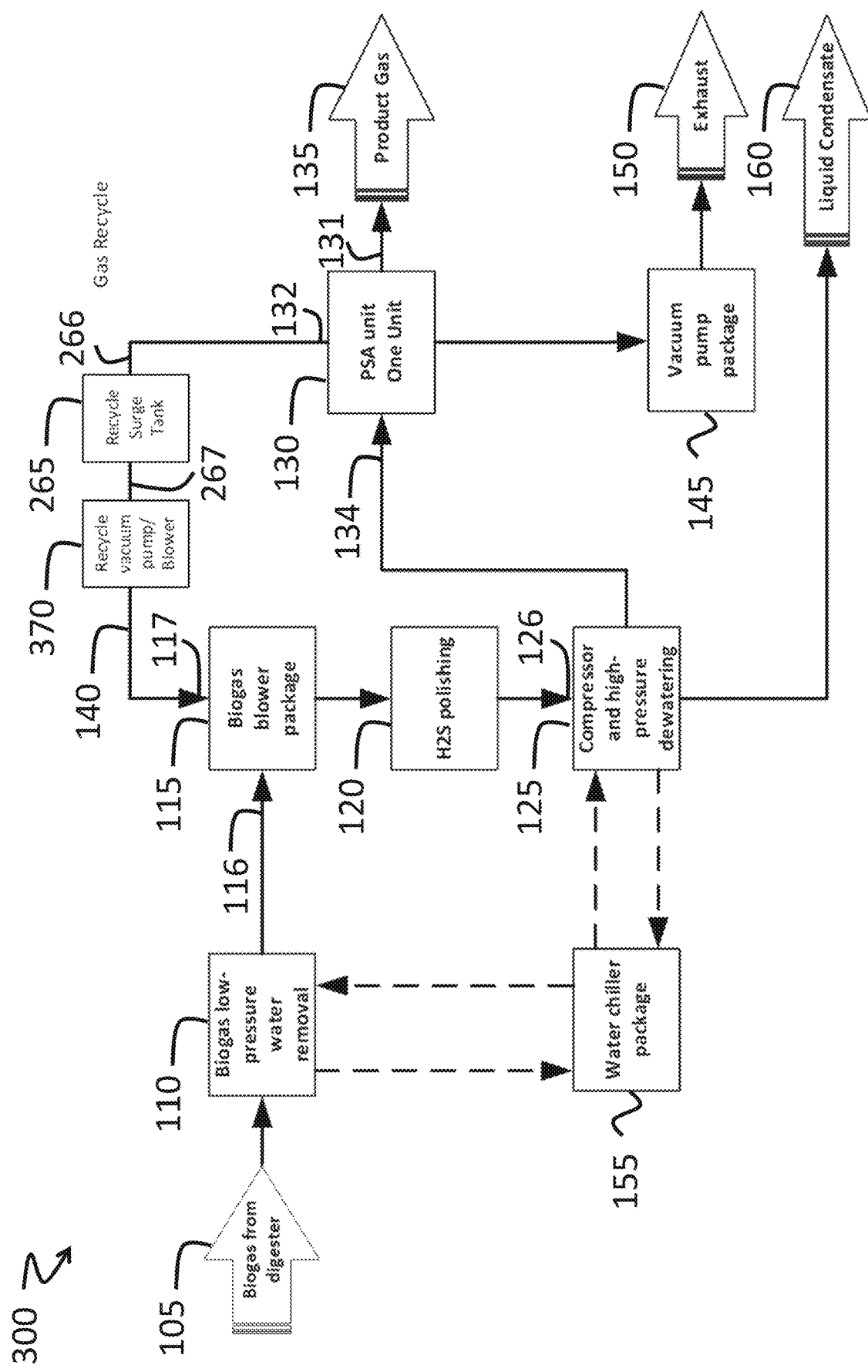
FIG. 4 is a schematic block diagram of a biogas upgrading system including a recycle surge tank and a recycle vacuum pump according to an embodiment of the present technology.

FIG. 4 is a schematic block diagram of a biogas upgrading system 300 including the recycle surge tank 265 and a recycle vacuum pump 370. The biogas extraction system 300 is similar or identical to the biogas extraction system 200, with the exception that it adds a pressure boost device, for example a recycle vacuum pump 370, within the recycling line 140. The recycle vacuum pump 370 is positioned downstream of the recycle surge tank 265 within the recycling line 140. The recycle vacuum pump 370 increases a pressure of the remainder of the biogas for delivery to the second inlet 117 of the biogas blower package 115, leading to an increase of a gas mass flow at an inlet 126 of the compressor 125. This gas mass flow increase leads to an optimization of energy consumed by the biogas upgrading system 300, which in turn affects energy consumption as it increases the mass flow of gas being compressed. In particular, the placement of the recycle vacuum pump 370 downstream of the recycle surge tank 265 allows the generation of sufficiently low pressure in the recycle surge tank 265 and increases the speed with which the beds of the PSA unit 130 may be depressurized in later stages of the depressurization process, more precisely in the following pressure recovery operations. Instead of the recycle vacuum pump 370, the use of a vacuum blower or of a pressure boost pump is also contemplated.

Figure 5:
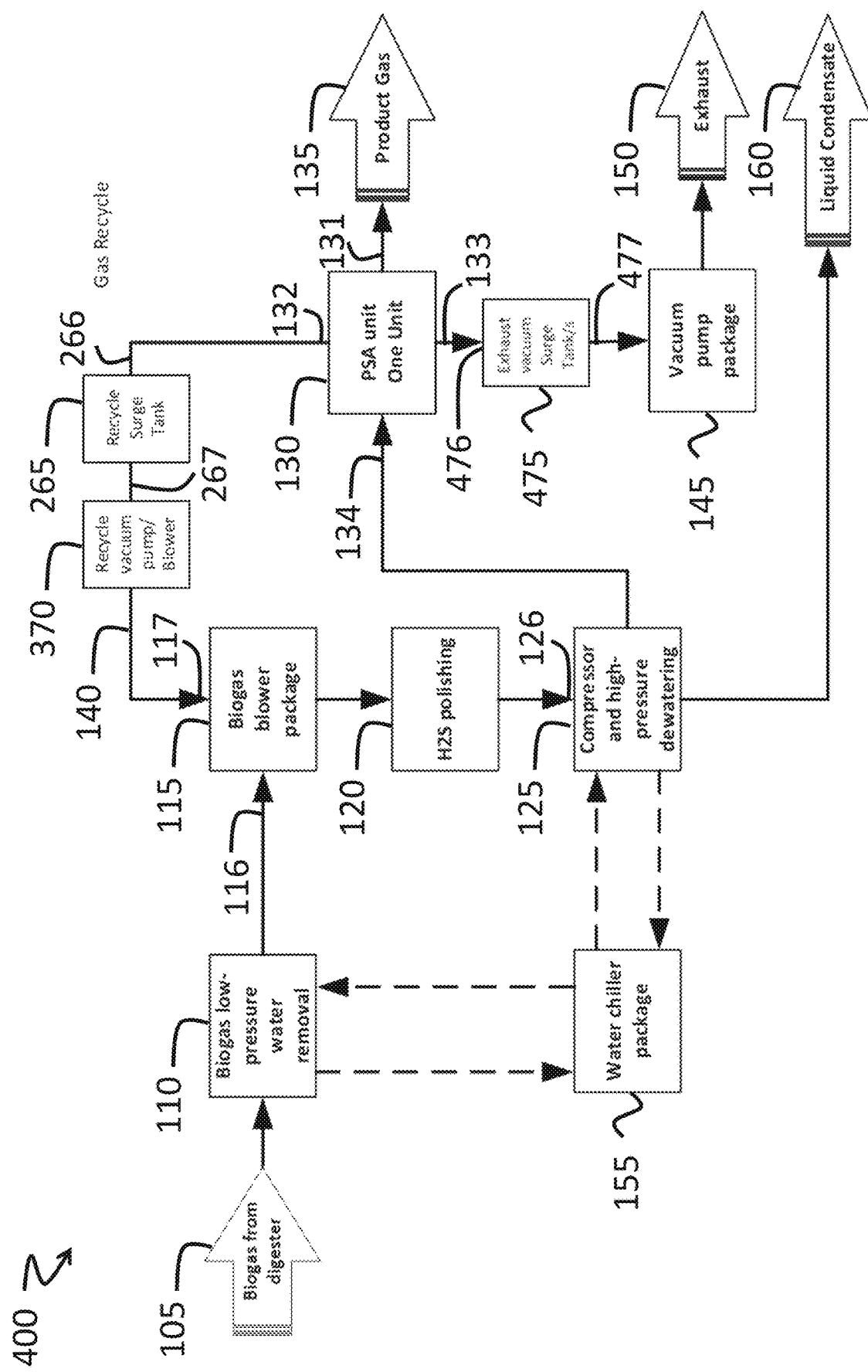
FIG. 5 is a schematic block diagram of a biogas upgrading system including the recycle surge tank, the recycle vacuum pump, and an additional exhaust surge tank according to an embodiment of the present technology.

FIG. 5 is a schematic block diagram of a biogas upgrading system 400 including the recycle surge tank 265, the recycle vacuum pump 370, and an additional exhaust surge tank 475. As in the case of the recycle surge tank 265, it is contemplated that a plurality of exhaust surge tanks 475 may be provided instead of a single exhaust surge tank 475. The biogas extraction system 400 is similar or identical to the biogas extraction system 300, with the exception that it adds another pressure boost device, for example another surge tank, that is, an exhaust surge tank 475 positioned between the third outlet 133 of the PSA unit 130 and the vacuum pump 145 for causing a pressure reduction, or vacuum, at the third outlet 133 of the PSA unit 130. The inclusion of the recycle vacuum pump 370 in the biogas upgrading system 300, as well as the inclusion of both the recycle vacuum pump 370 and of the exhaust surge tank 475 in the biogas upgrading system 500, improve further the pressure swing in the PSA unit 130 and therefore increase further its methane recovery efficiency. Adding the exhaust surge tank 475 also results in an increase with the purity of methane obtained in the product delivered at the product gas outlet 135. The exhaust surge tank 475 results in the PSA beds achieving sufficiently negative pressure for regenerating the adsorbent. Additional carbon dioxide is removed when the adsorbent is placed under vacuum.

It is contemplated that another surge tank (not shown) may be placed between the first outlet 131 of the PSA unit 130 and the product gas outlet 135, in view of reducing a pressure at the first outlet 131 of the PSA unit 130.

Figure 6:
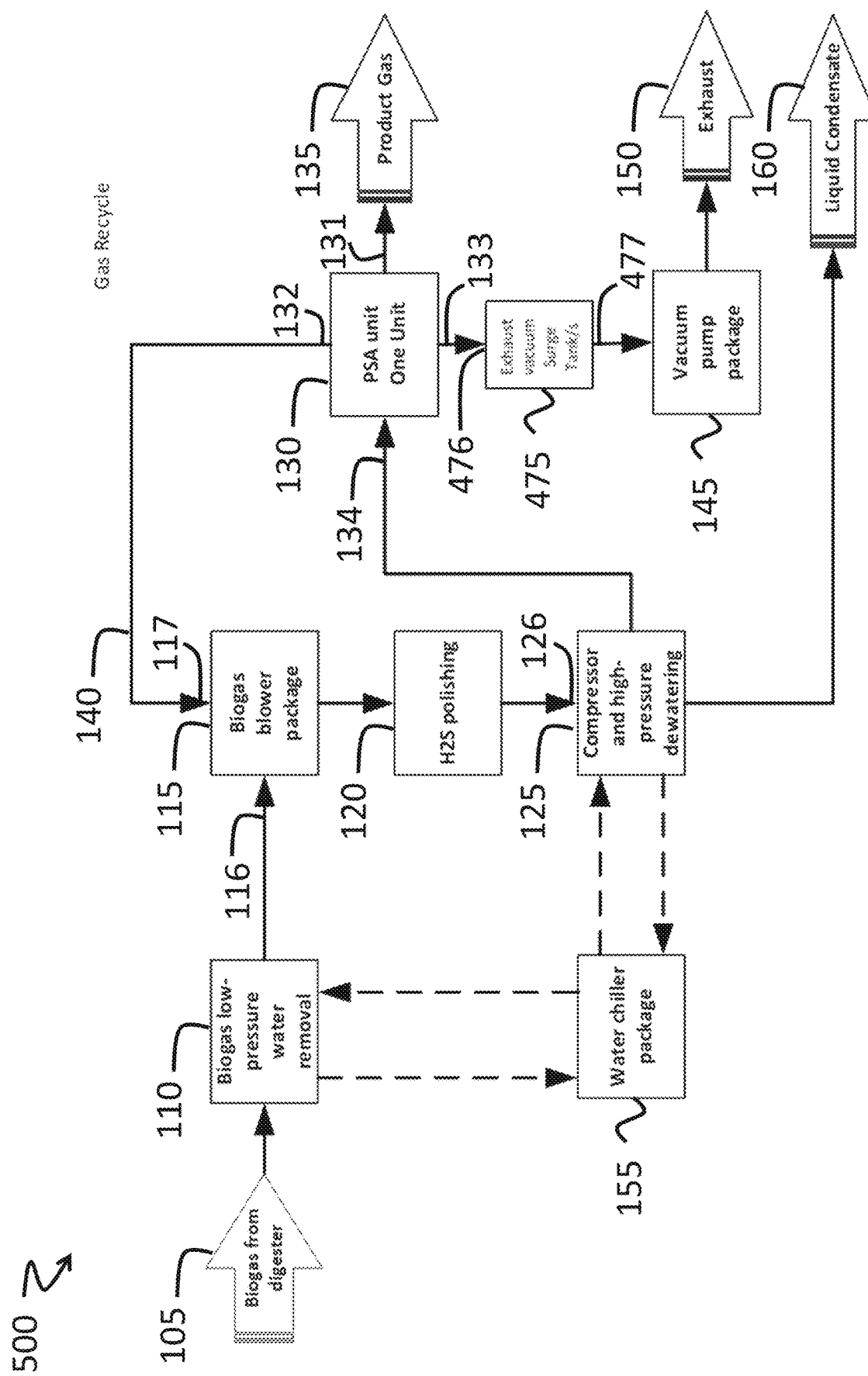
FIG. 6 is a schematic block diagram of a biogas upgrading system including the exhaust surge tank according to an embodiment of the present technology.
Figure 7:
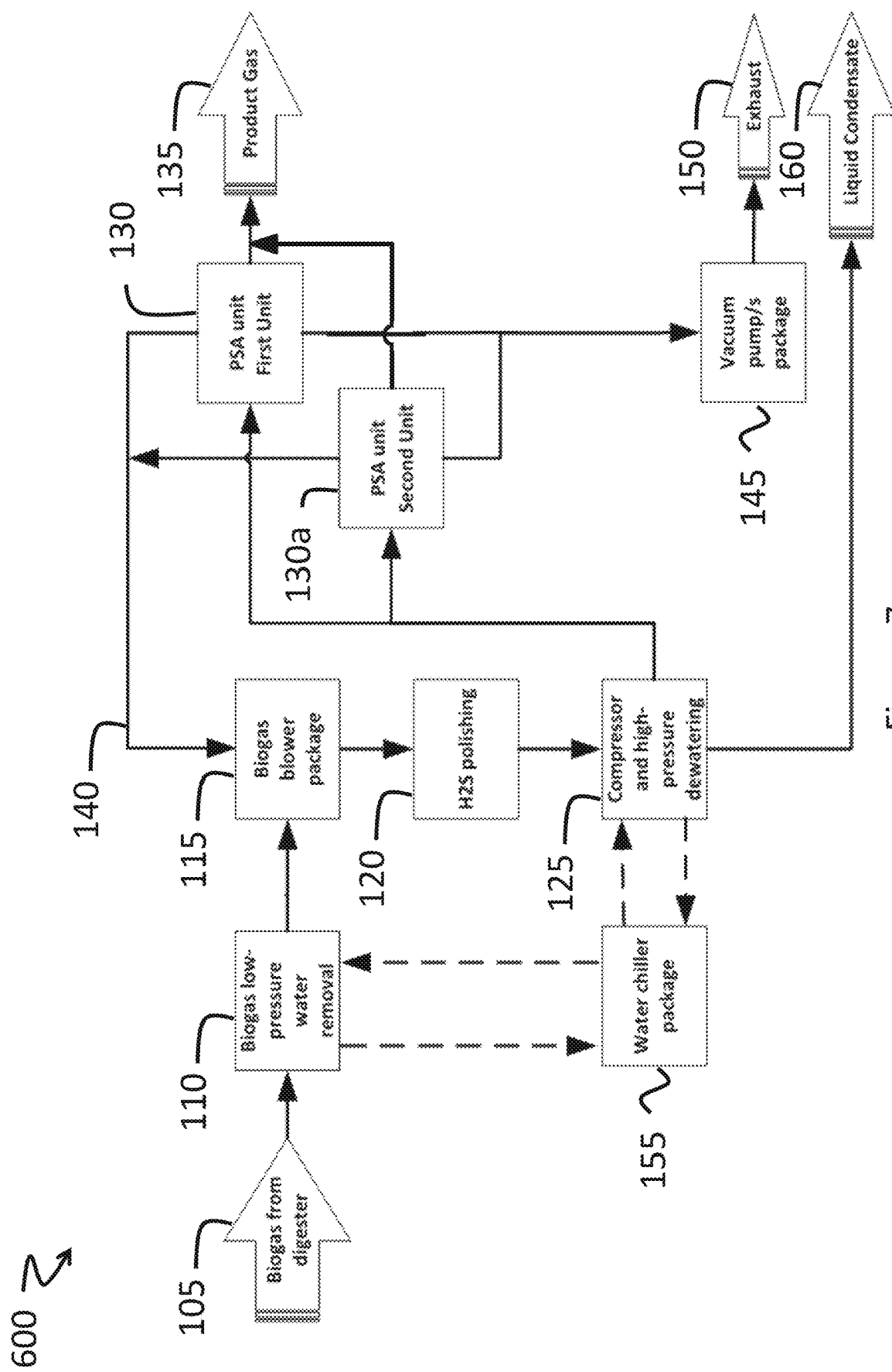
FIGS. 7 to 11 respectively are schematic block diagrams of biogas upgrading systems similar to those of FIGS. 2 to 6, the systems further including two cooperating PSA units according to embodiments of the present technology.
Figure 8:
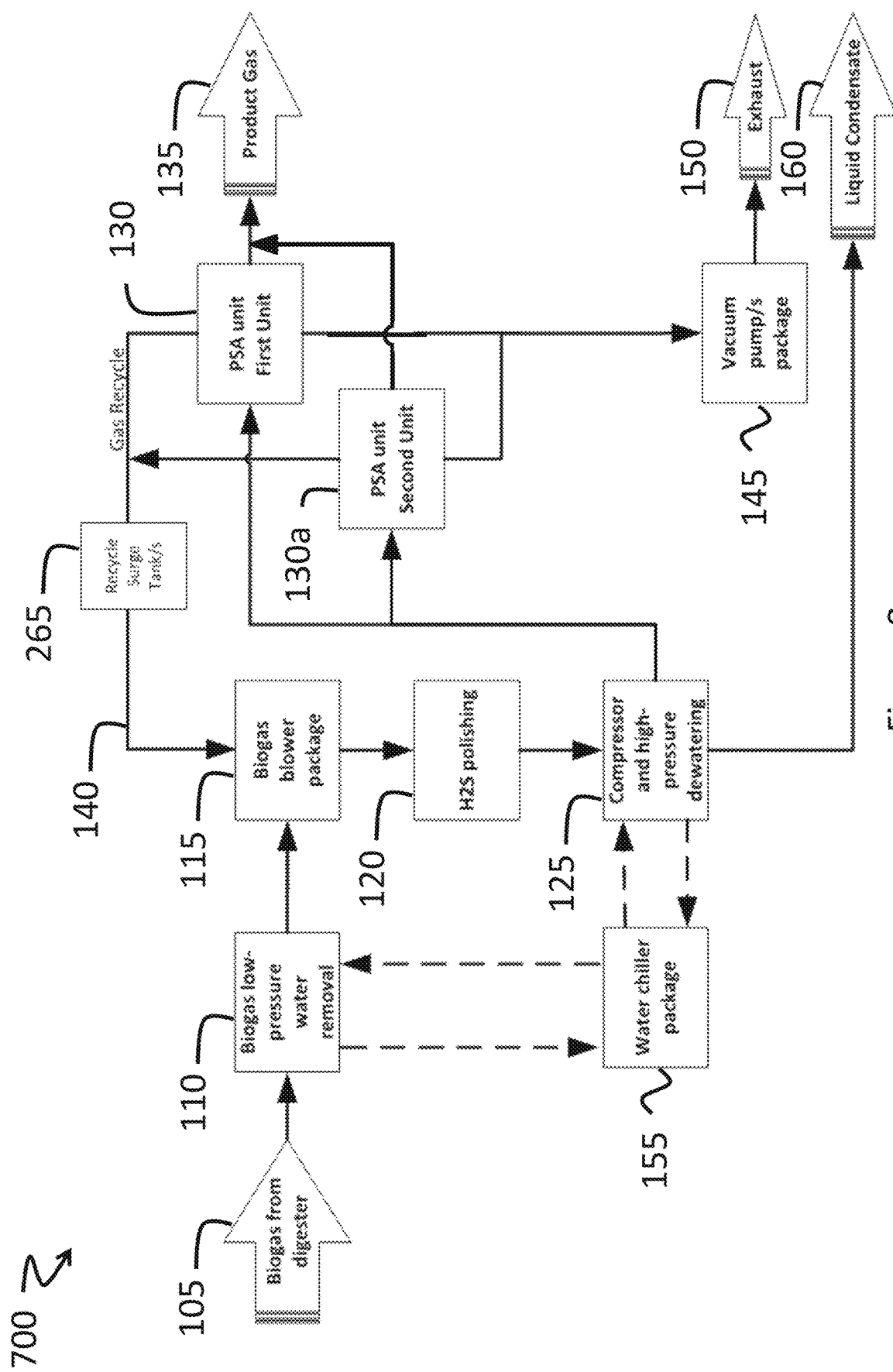
Figure 9:
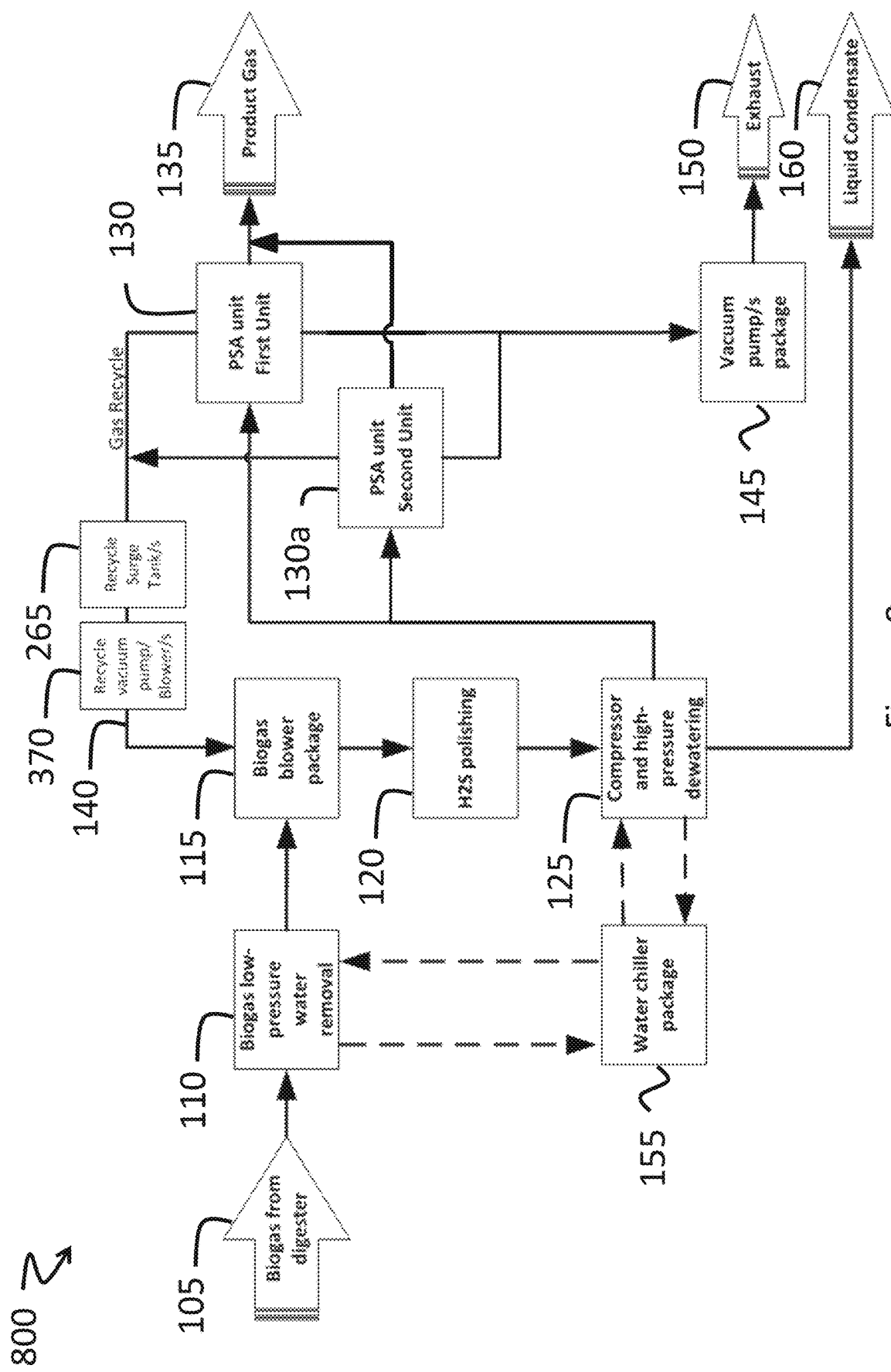
Figure 10:
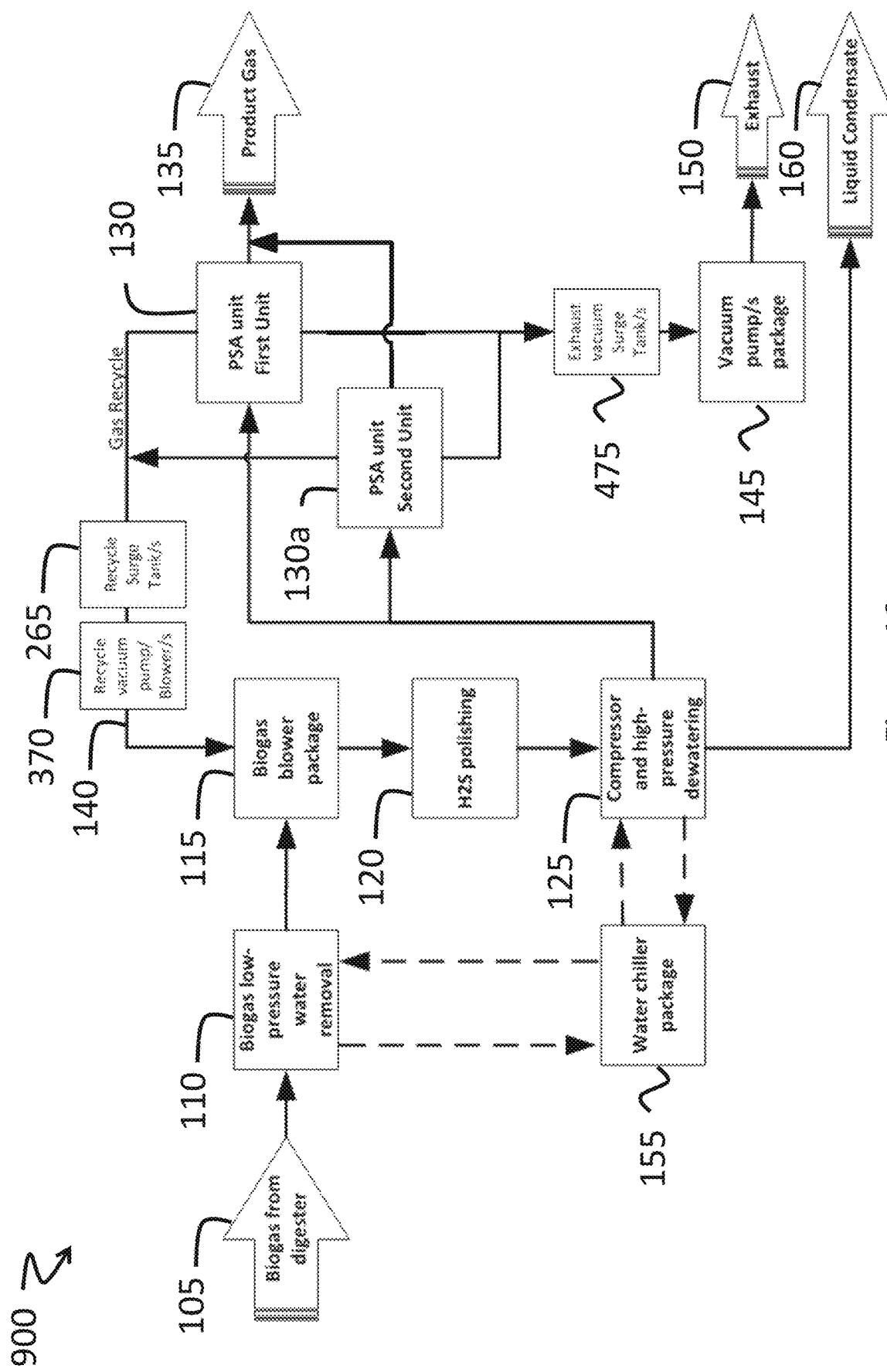
Figure 11:
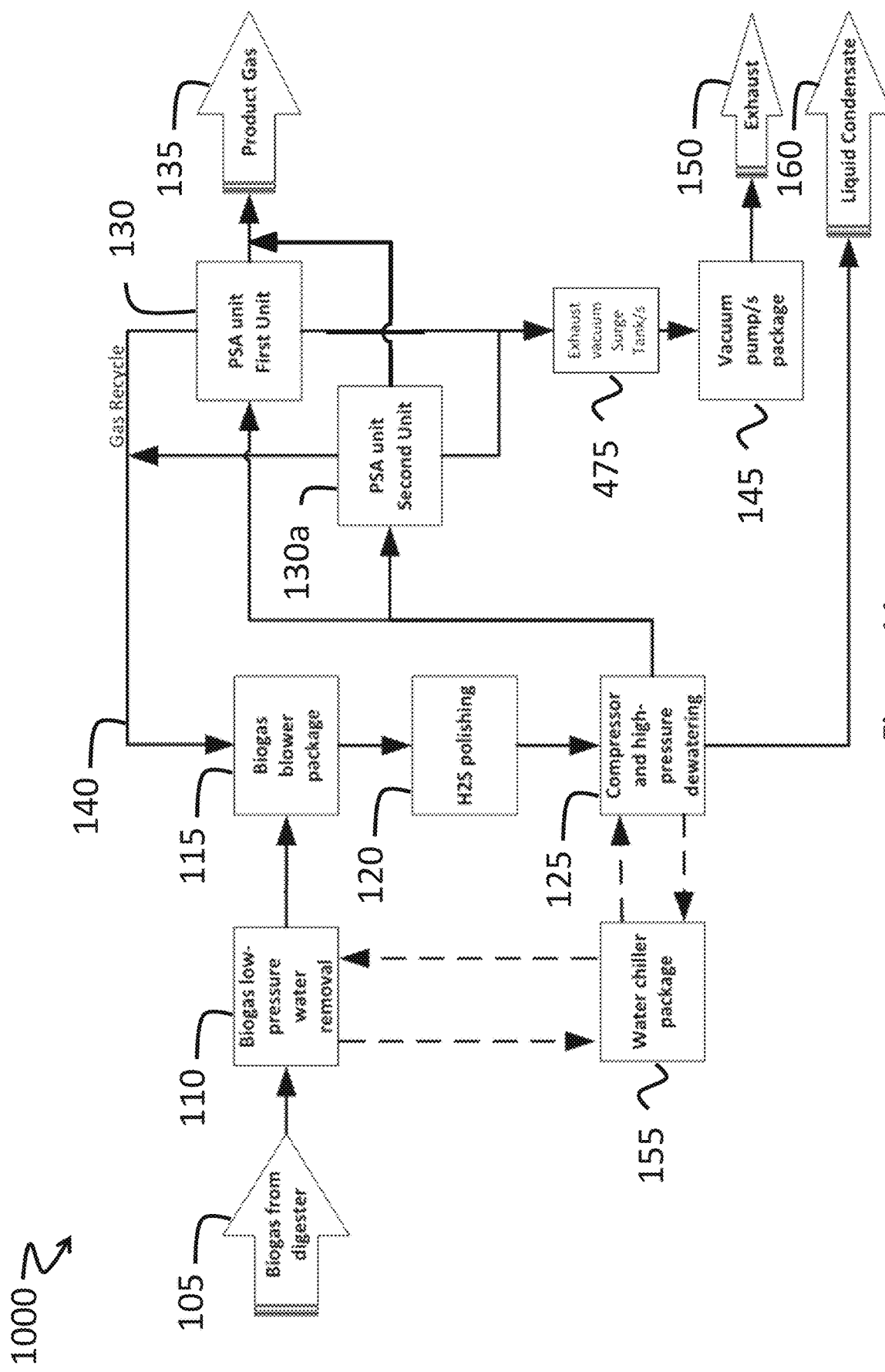

FIG. 6 is a schematic block diagram of a biogas upgrading system 500 including the exhaust surge tank 475 according to an embodiment of the present technology. The biogas extraction system 500 is similar or identical to the biogas extraction system 100, with the exception that it adds the exhaust surge tank 475 positioned between the third outlet 133 of the PSA unit 130 and the vacuum pump 145 for causing a pressure reduction, or vacuum, at the third outlet 133 of the PSA unit 130.

Various embodiments of the biogas upgrading systems 300 and 400 have reached an efficiency of methane recovery between 95 and 100. For example, the inclusion of the exhaust surge tank 475 upstream of the vacuum pump 145 may increase the methane recovery of about 75 to 90%, combined with a carbon dioxide recovery of about 96%. Embodiments combining the recycle surge tank 265, the recycle vacuum pump 370 and the exhaust surge tank 475 may result in a methane recovery of about 99 to 99.5%.

Although not shown, various embodiments of the biogas upgrading system may include other combinations of the recycle surge tank 265, the recycle vacuum pump 370 and the exhaust surge tank 475. Additional surge tanks may also be installed on the line between the first outlet 131 of the PSA unit 130 and the product gas outlet 135 and/or on the line between the biogas inlet 105 and the inlet 134 of the PSA unit 130.

FIGS. 7 to 11 respectively are schematic block diagrams of biogas upgrading systems similar to those of FIGS. 2 to 6, the systems further including two cooperating PSA units according to embodiments of the present technology. On second outlet connected to the recycling line 140 and, if present, via the recycle surge tank 265 and the recycle vacuum pump 370, and directs gas that is substantially free of methane content via a third outlet to the exhaust 150. A first manifold (not shown) may connect the first outlet of the PSA unit 130 and the first outlet of the second PSA unit 130a to the product gas outlet 135. A second manifold (not shown) may connect the second outlet of the PSA unit 130 and the second outlet of the second PSA unit 130a to the recycling line 140. A third manifold (not shown) may connect the third outlet of the PSA unit 130 and the third outlet of the second PSA unit 130a to the vacuum pump 145, either directly or via the exhaust surge tank 475. Both PSA units 130 and 130a may thus operate in parallel, in the same or equivalent manner.

Table I summarizes some of the distinctions between biogas upgrading systems having one or two PSU units 130.

TABLE I

| Parameter | 9-bed PSA unit | 12-bed PSA unit | 2 × 6-bed PSA units |
|---|---|---|---|
| Number of rotary valves | 1 | 1 | 2 (1 per PSA Unit) |
| Relative bed size as function of fixed feed gas flow rate | Larger adsorption bed size | Smaller adsorption bed volume than in the 9-bed PSA unit | Smaller volume than in the 9-bed PSA unit, similar volume to the 12-bed PSA unit. |
| Relative depressurisation time | A function of bed volume and pipeline diameters and length of run. All things being equal, the longest depressurisation time | A function of bed volume and pipeline diameters and length of run. All things being equal, the shortest depressurisation time | A function of bed volume and pipeline diameters and length of run. All things being equal, a similar depressurisation time as in the 12-bed PSA unit |
| Pressure equalisation steps | Commonly 2 or 4 equalisation steps | Amenable up to 5 equalisation steps | Fewer than 2 or 3 equalisation steps |
| Turndown range | 30 to 100% | 30 to 100% | 15 to 100% |
| Feed flow management | Single feed, no flow slitting needed | Single feed, no flow splitting needed | Management needed fir a split feed between two streams. |

FIGS. 7 to 11, biogas upgrading systems 600, 700, 800, 900 and 1000 are respectively similar to the biogas upgrading systems 100, 200, 300, 400 and 500, with adding thereto a second PSA unit 130a. The second PSA unit 130a may have the same characteristics as the PSA unit 130 introduced hereinabove, or may have different characteristics, for example including more or fewer beds, the beds being larger or smaller, using a different type of valve and/or a different cycle, and the like. The second PSA unit 130a as shown has an inlet receiving a share of the compressed biogas from the compressor 125, a first outlet connected to the recycling line 140 and a second outlet connected to the vacuum pump 145, either directly or via the exhaust surge tank 475. Some details of earlier Figures are not repeated for brevity.

Figure 12:
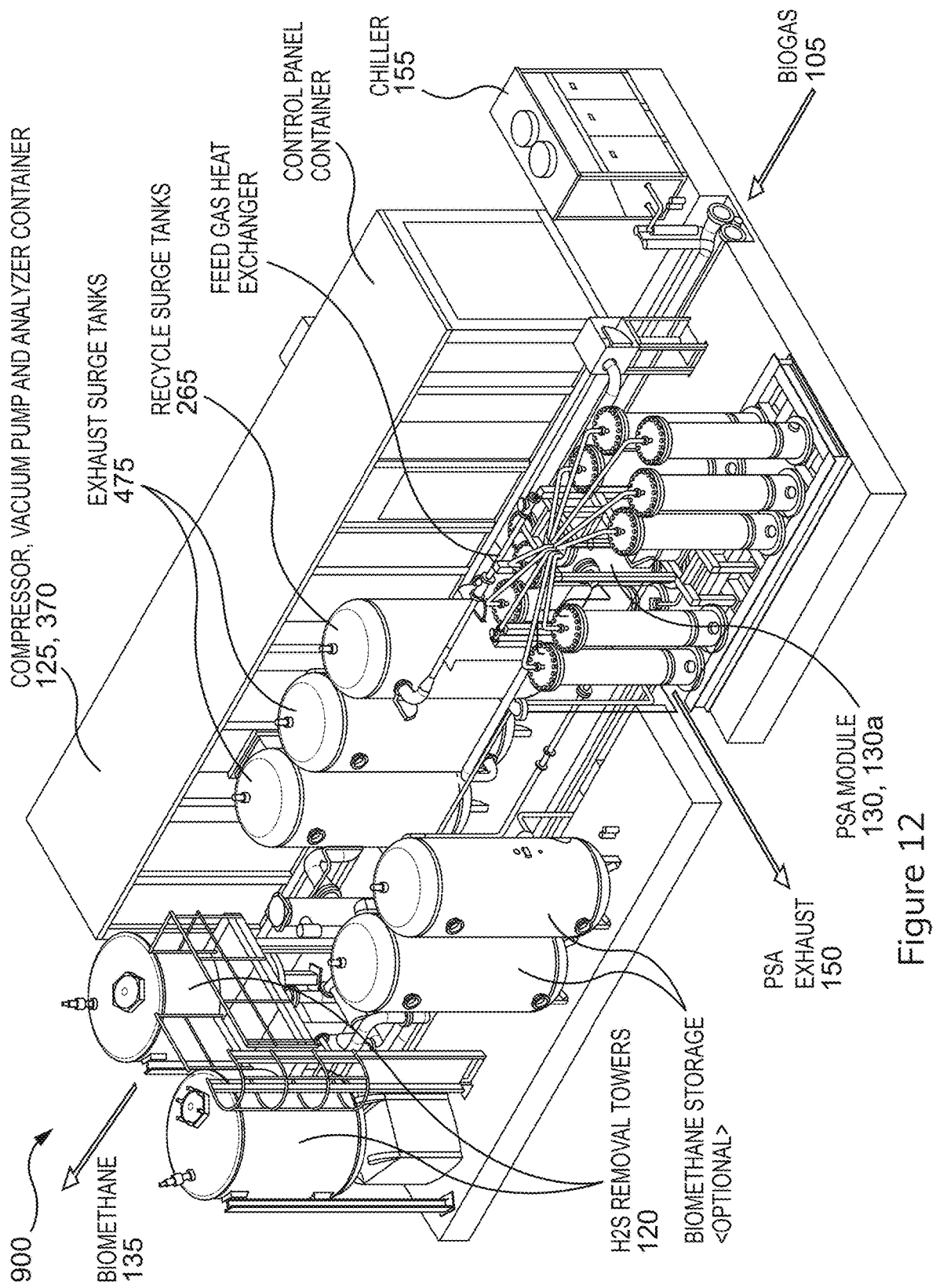
FIG. 12 is a perspective view of the biogas upgrading system according to an embodiment of the present technology.

Although designated herein as a "second" PSA unit, this PSA unit 130a may be understood as performing methane recovery from the biogas received at the biogas inlet 105, in the same manner as the PSA unit 130 introduced hereinabove. As illustrated on FIGS. 7 to 11, the second PSA unit 130a receives biogas from the biogas inlet 105 (via the low-pressure water-removal unit 110, the biogas blower package 115, the polishing device 120 and the compressor 125), directs a fraction of the recovered methane via a first outlet to the product gas outlet 135, directs another fraction of the recovered methane to the biogas blower 115 via a FIG. 12 is a perspective view of the biogas upgrading system according to an embodiment of the present technology. Some of the components of the biogas upgrading system 900 are reproduced on FIG. 12; some other components are not shown, being enclosed in buildings or like enclosures. Additional components such as a biogas storage, a feed gas heat exchanger, a control panel and a gas analyzer may or may not be present in various embodiments.

Figure 13:
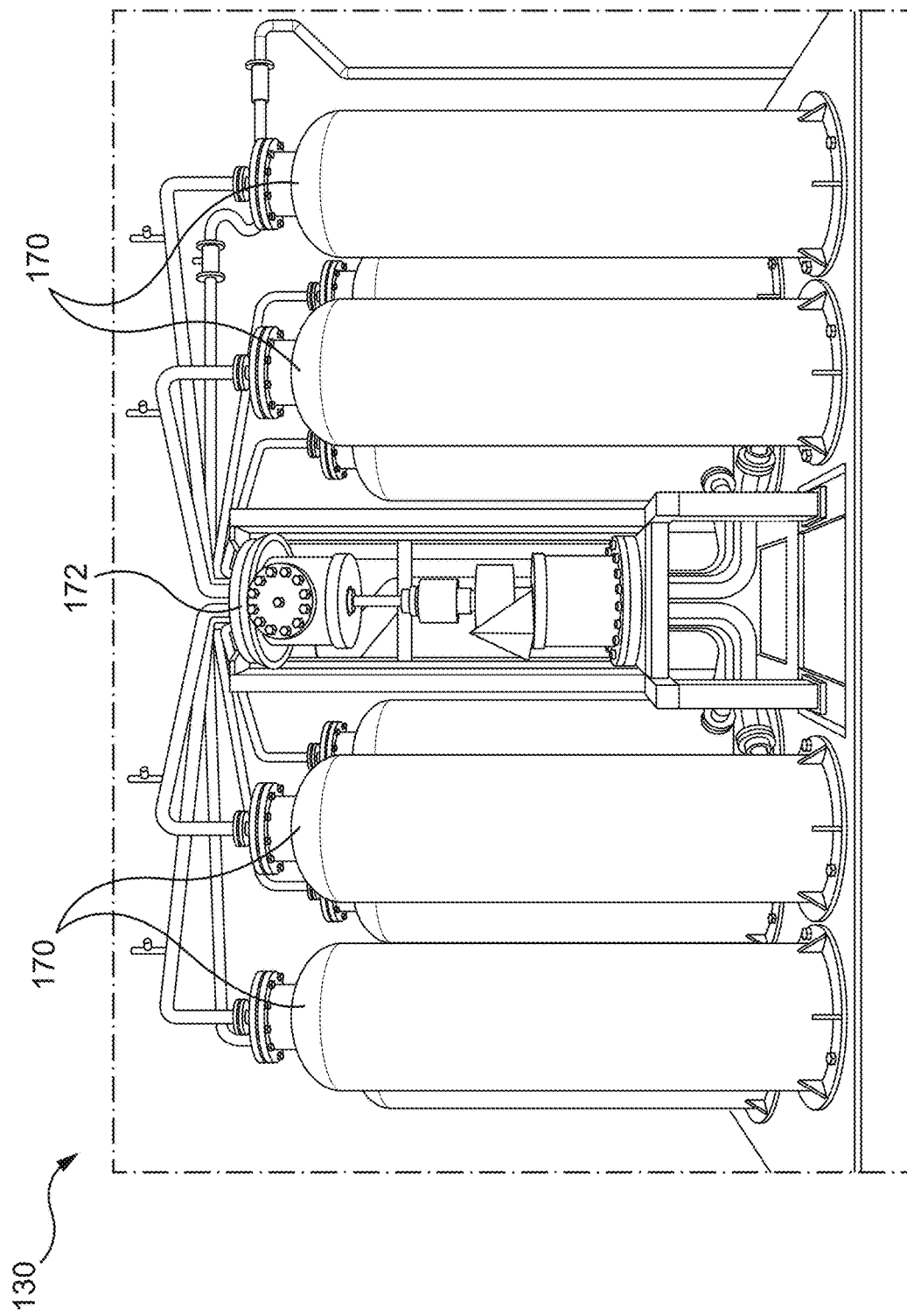
FIG. 13 is front elevation view of PSA beds and of a rotary valve of the PSA unit according to an embodiment of the present technology.

FIG. 13 is a front elevation view of PSA beds 170 and of a rotary valve 172 of the PSA unit 130. In the PSA unit 130, gases a directed toward a plurality of PSA beds 170 by a rotary valve 172 The use of a valve assembly having a pair of rotary valves 172 operated in tandem is also contemplated.

Figure 14:
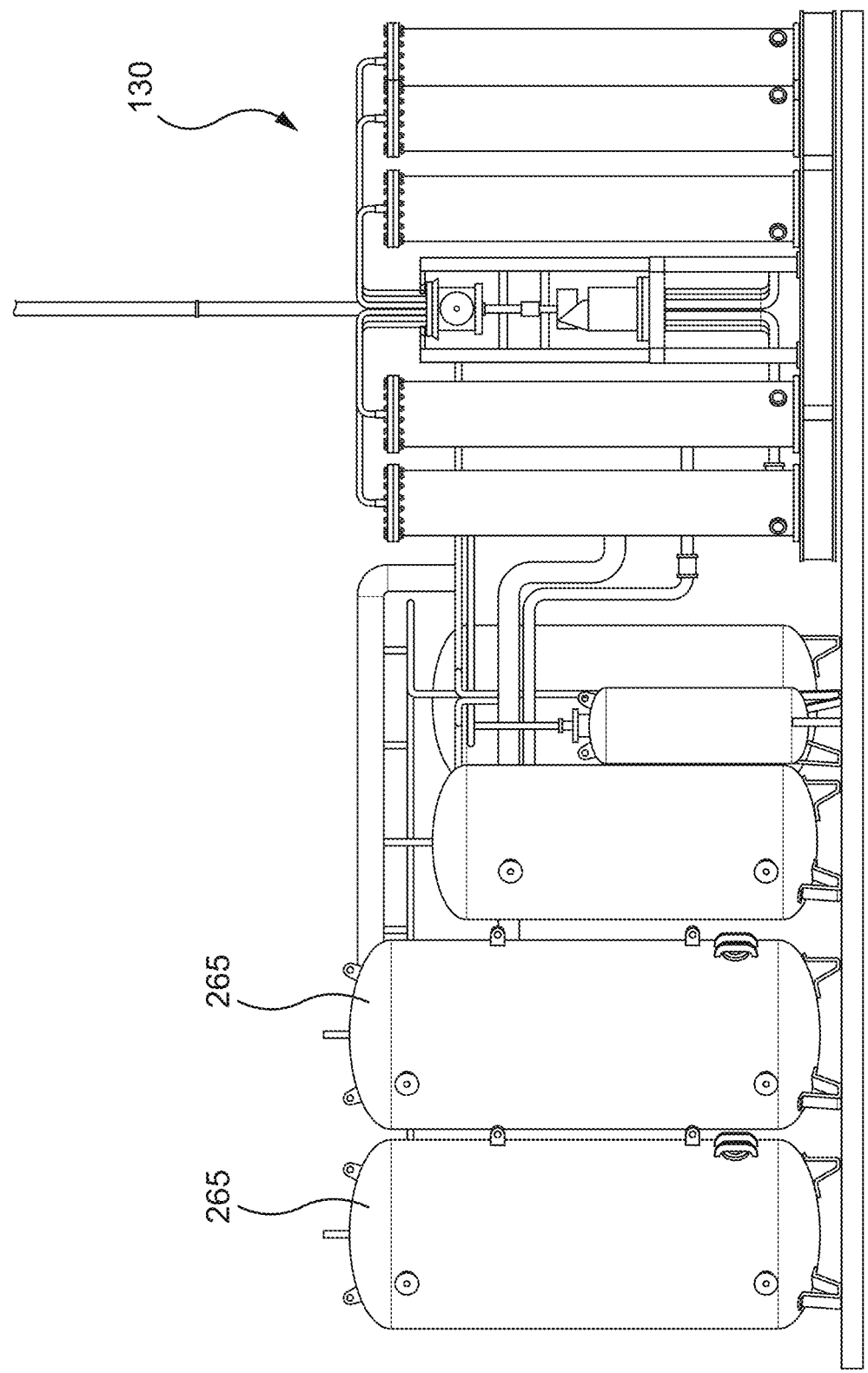
FIG. 14 is a perspective view of the surge tanks and of the PSA unit according to an embodiment of the present technology.

FIG. 14 is a perspective view of the surge tanks and of the PSA unit. FIG. 14 suggest possible relative sizes of the PSA beds 170 and of the surge tanks. However other relative sizes are contemplated, and the illustration of FIG. 14 should not be construed as limiting.

Table II shows experimental methane recovery results obtained using the present surge tank 265 and the recycle vacuum pump 370, which consumed 0.65 kW for the recycle duty shown in the Table. The PSA unit 130 was a 9-bed PSA unit using a rotary valve 172. PSA methane recovery reached 99.9%.

TABLE II

| Parameter | Units | Feed Flow | Recycle Flow | Product Flow | Exhaust Flow |
|---|---|---|---|---|---|
| Temperature | ° C. | 30.00 | 50.36 | 19.29 | 60.00 |
| Pressure | bar | 1.05 | 1.00 | 7.20 | 1.13 |
| Total Flow | m3/h | 225 | 37.21 | 123.61 | 92.31 |
| Composition Unit | | | | | |
| Methane | mole % | 52.77 | 65.31 | 95.98 | 0.00 |
| Carbon Dioxide | mole % | 42.50 | 34.05 | 3.06 | 99.46 |
| Nitrogen | mole % | 0.50 | 0.52 | 0.86 | 0.06 |
| Oxygen | mole % | 0.20 | 0.07 | 0.09 | 0.04 |
| Hydrogen Sulfide | mole % | 0.01 | 0.04 | 0.00 | 0.00 |
| Water | ppmv | 40,000 | 0.00 | 0.00 | 4,382 |
| Non methane VOC | ppmv | 182 | 0.00 | 0.00 | 0.00 |

In Table II, VOC is for "volatile organic compounds" and ppmv is for "parts per million in volume". Table II shows flow contents and other characteristics measured in the system 500. The Feed Flow column represents the composition and other characteristics of biogas received at the biogas inlet 105. The 3 right-most columns respectively provide compositions and other characteristics for gases in the recycling line 140, for the desired methane product in the product gas outlet 135, and for water and other compounds expelled at the exhaust 150 and at the liquid condensate outlet 160. The values presented in the 3 right-most columns are averaged over time.

Various embodiments of the biogas upgrading systems as disclosed herein may be contemplated. For example and without limitation, the PSA unit 130 may comprise a 6-bed, 9-bed, 12-bed or 18-bed PSA device. For example and without limitation, Sawada's 6-bed PSA cycle is suitable for implementing an embodiment of the presently disclosed adsorption processes. The PSA unit 130 may include a rotary valve 172 or a multiple port valve for sequentially directing biogas from its inlet 134 to the various PSA beds 170.

Figure 1:
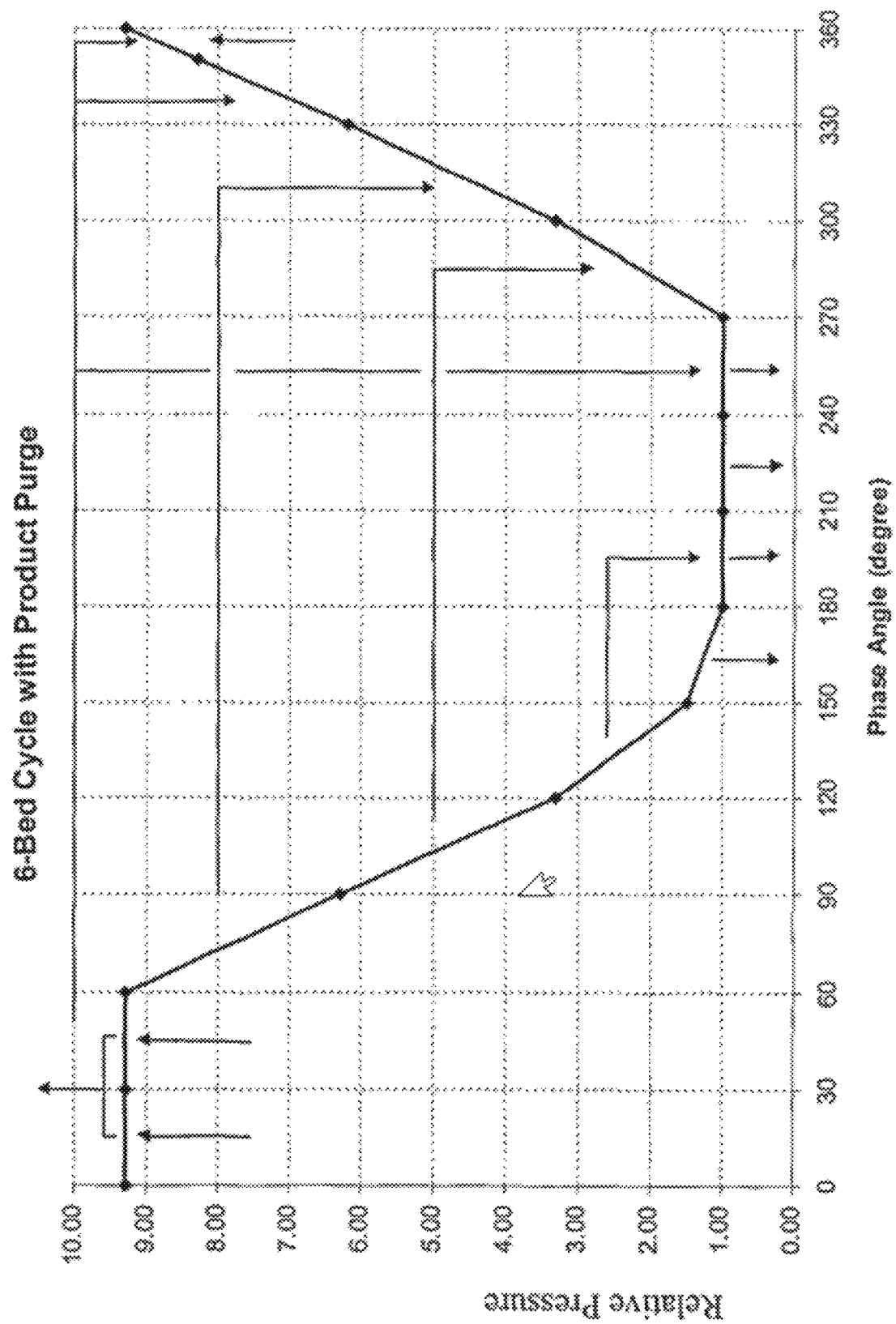
FIG. 1 (Prior Art) is an example of a 6-bed pressure swing adsorption (PSA) cycle showing a single common adsorber pressure profile.

The PSA unit 130 may implement a cycled process controlled by a speed of the valve. It has been observed that, as the speed of the valve increases, the frequency of regeneration increases while the rate of methane loss also increases. This loss may be reduced by controlling a fraction of the biogas expelled from the second outlet 132 of the PSA unit 130 into the recycling line 140. Additionally, the valve of the PSA unit 130 is used to set a pressure cycle timing on, for example, 6, 9 or 12 PSA beds 170. The valve may give a fixed timing and spacing of timing for each of the beds according to a pressure sequence. A typical pressure profile following the change in pressure within a single bed is shown in FIG. 1. The volume flow rate through the biogas upgrading system may be adjusted by adjusting a speed of the valve. The volume of the beds being fixed, the speed of depressurization of the beds at each pressure letdown step should increase in order to keep up and return the adsorbent back to a fully regenerated state in order to avoid, as much as possible, volumetric holdups along the recycling line 140 and on the line between the PSA unit 130 and the product gas outlet 135. Embodiments of the present biogas upgrading system allow to prevent holdup delays that could impair adsorbent regeneration. The introduction of surge tanks adds a buffer volume in the process line, giving the PSA beds 170 the ability to sufficiently reduce pressure in the time allotted by the valve.

Figure 15:
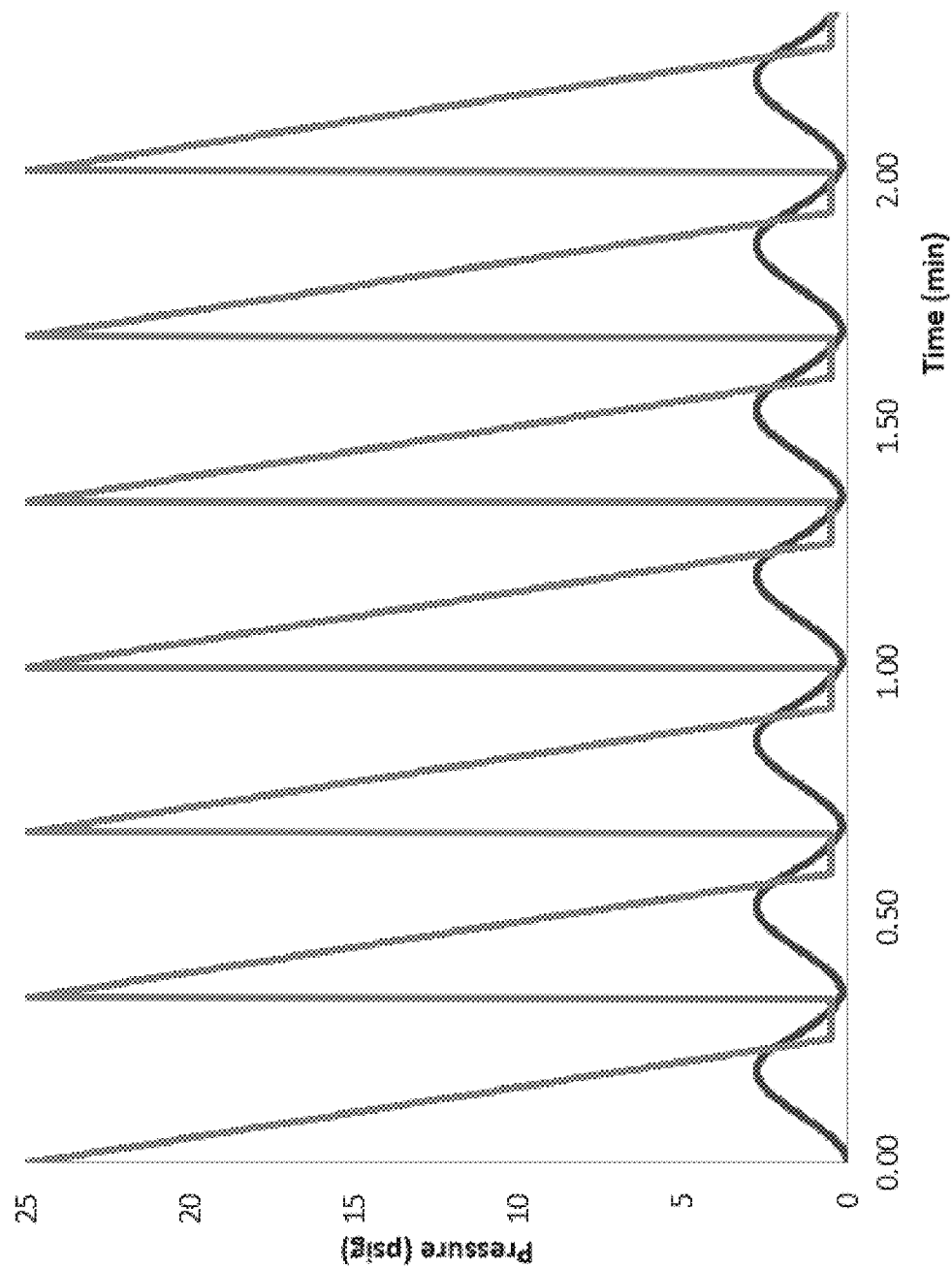
FIG. 15 is a graph illustrating pressure variations in PSA beds and in the recycling line according to an embodiment of the present technology.

FIG. 15 is a graph illustrating pressure variations in PSA beds 170 and in the recycling line 140. Pressure in successive PSA beds 170 follows a sawtooth profile and jumps rapidly to a maximum value of about 25 psig (pound per square inch relative to atmospheric pressure) in the illustration of FIG. 15, as the rotary valve 172 connects the inlet 134 of the PSA unit 130 to the successive PSA beds 170. The pressure in a given PSA bed 170 gradually reduces to a minimum between about 0 and 2 psig, following which the rotary valve connects the inlet 134 of the PSA unit 130 to a next PSA bed 170. The pressure in the PSA bed 170 is gradually reduced as the methane is recovered by the PSA unit 130. On FIG. 15, the pressure in the successive PSA beds 170 shows 7 successive peaks. In a 6-bed PSA unit 130, the first and the seventh peaks would take place in a same PSA bed 170. In a 9-bed or 12-bed PSA unit 130, the 7 peaks would take place in distinct PSA beds 170. The graph of FIG. 15 may be considered generic and apply to any PSA unit 130 configuration.

On FIG. 15, 17.5% of the feed gas volume flow rate is returned in the recycling line 140.

Without the surge tank 265, the pressure in the recycling line 140 would track the pressure in the PSA beds 170 up to the second inlet 117 of the biogas blower 115. However, the pressure in the recycling line 140 downstream of the surge tank 265 varies substantially according to a sine wave with a significantly reduced amplitude, between about zero and about 2.5 psig. It may be observed that the presence of the surge tank 265 significantly attenuates the maximum pressures within the recycling line 140. In the illustrated example, the rotary valve 172 moves from one PSA bed 170 to another at intervals of about 20 seconds. The limited pressures attained in the recycling line 140, thanks to the inclusion of the surge tank 265, provides for a rapid diminution of the pressure in the PSA beds 170 and for a rapid cycling between the successive PSA beds 170.

In an embodiment of the present technology, in the absence of the surge tank 265 in the recycling line 140, recycling of gas may begin at a pressure delivered at the inlet 134 of the PSA unit 130 of 70 psig and falling to about 0 psig, 50 psig and falling to about 0 psig, or 20 psig and falling to about 0 psig. The final pressure in the PSA beds 170 at the end of each recycling step may for example be between 2 and 0 psig. The rotary valve 172 may be caused to switch from one PSA bed 170 to the next PSA bed 170 as rapidly as possible, as soon as the intended low pressure is reached in the PSA beds 170. Such operations may result an overall gas recovery in a range of about 75% to 84.9%.

In another embodiment in which the surge tank 265 is added to the recycling line 140, the pressure in each PSA bed 170 reduces more rapidly and the rotary valve 172 may switch at a faster rate between the PSA beds 170. This results in an improvement of methane recovery. Recycling of gas may begin at a pressure delivered at the inlet 134 of the PSA unit 130 of 70 psig and falling to about 0 psig, 50 psig and falling to about 0 psig, or 20 psig and falling to about 0 psig. The final pressure in the PSA beds 170 at the end of each recycling step may for example be between 2 and 0 psig. While these pressure values may be equivalent to those obtained without the addition of the surge tank 265, such operations may result an overall gas recovery in a range of about 85% to 98.9%.

In yet another embodiment, adding both the surge tank 265 and the recycle vacuum pump 370 to the recycling line 140 may further reduce the pressure reduction time spent in each PSA bed 170. This may result in a further improvement of the methane recovery. Furthermore, the addition of the recycle vacuum pump 370 allows reaching lower final pressures in the PSA beds 170. Recycling of gas may begin at a pressure delivered at the inlet 134 of the PSA unit 130 of 70 psig and falling to about 0 psig. 50 psig and falling to about 0 psig. 30 psig and falling to about 10 psig, 20 and falling to about 0 psig. The final pressure in the PSA beds 170 at the end of each recycling step may be between 2 and −4 psig. Such operations may result an overall gas recovery in a range of about 98 and 99.9%.

Is it believed that the rapid depressurization obtained in the presence of the surge tank 265 provides some more time for the adsorbed methane to diffuse out of the adsorbent particles towards the recycling line 140 while the more strongly bound $CO_2$ remains adsorbed. With more time at a lower pressure in the PSA beds 170, some $CO_2$ desorbs and displaces the methane in the interstitial spaces between the adsorbent particles, towards the recycling line 140. A resulting stream that is a mix of methane and $CO_2$ and that contains a higher concentration of methane than the feed stream and is then recycled for reprocessing. The surge tank 265 allows more rapid pressure reduction, in turn removing restrictions to flow. Additional use of the recycle vacuum pump 370 provides obtaining a lower final pressure so that the $CO_2$ desorption becomes sufficient for flushing the methane out of the PSA beds 170. The reduced pressure allows to desorb $CO_2$ to the exhaust, minimizing to minimize the methane that is retained in the PSA beds 170 before moving to the product gas outlet 135. The approach minimizes methane losses and removes a large part of the greenhouse gas impact of methane released to the atmosphere. Thermal treatment of the exhaust gas to remove any remaining methane before release to the atmosphere is no longer necessary.

Those of ordinary skill in the art will realize that the description of the system for recovering methane from a biogas are illustrative only and are not intended to be in any way limiting. Other embodiments will readily suggest themselves to such persons with ordinary skill in the art having the benefit of the present disclosure. Furthermore, the disclosed system may be customized to offer valuable solutions to existing needs and problems related to the limited methane recovery from biogases. In the interest of clarity, not all of the routine features of the implementations of the system are shown and described. In particular, combinations of features are not limited to those presented in the foregoing description as combinations of elements listed in the appended claims form an integral part of the present disclosure. It will, of course, be appreciated that in the development of any such actual implementation of the system, numerous implementation-specific decisions may need to be made in order to achieve the developer's specific goals, such as compliance with application-, system-, and business-related constraints, and that these specific goals will vary from one implementation to another and from one developer to another. Moreover, it will be appreciated that a development effort might be complex and time-consuming, but would nevertheless be a routine undertaking of engineering for those of ordinary skill in the field of biogas processing having the benefit of the present disclosure.

The present disclosure has been described in the foregoing specification by means of non-restrictive illustrative embodiments provided as examples. These illustrative embodiments may be modified at will. The scope of the claims should not be limited by the embodiments set forth in the examples, but should be given the broadest interpretation consistent with the description as a whole.

What is claimed is:

1. A system for recovering methane from a biogas, comprising:
    a first pressure swing adsorption (PSA) unit adapted to:
        recover methane from the biogas,
        direct a first fraction of the recovered methane from a first outlet of the first PSA unit toward a product gas outlet,
        direct a second fraction of the recovered methane from a second outlet of first the PSA unit toward a recycling line, and
        direct a remainder of the biogas from a third outlet of the first PSA unit toward an exhaust;
    a biogas inlet fluidly connected to a biogas source;
    a gas mixer fluidly connected to the biogas inlet, to the recycling line and to the first PSA unit, the gas mixer being adapted to:
        form a combination of biogas received at the biogas inlet and of the second fraction of the recovered methane, and
        supply the combination to the first PSA unit for methane recovery; and
    a surge tank within the recycling line, the surge tank having an inlet fluidly connected to the second outlet of the first PSA unit, the surge tank further having an outlet fluidly connected to an inlet of the gas mixer, the surge tank being operative to cause a pressure reduction at the second outlet of the first PSA unit and to deliver the second fraction of the recovered methane to the inlet of the gas mixer.

2. The system of claim 1, further comprising a second PSA unit adapted to:
    perform an initial recovery of methane from the biogas;
    direct the methane resulting from the initial recovery from a first outlet of the second PSA unit toward the recycling line; and
    direct a remainder of the biogas from which the methane is initially recovered from a second outlet of the second PSA unit to the exhaust.

3. The system of claim 2, wherein:
    the inlet of the surge tank is further fluidly connected to the first outlet of the second PSA unit; and
    the surge tank is further operative cause a pressure reduction at the first outlet of the second PSA unit and to deliver the recovered methane recovered by the second PSA unit to the inlet of the gas mixer.

4. The system of claim 1, further comprising a first pressure boost device positioned downstream of the surge tank in the recycling line, the first pressure boost device being operative to decrease a pressure at the second outlet of the first PSA and to increase a pressure of the remainder of the biogas for delivery to the inlet of the gas mixer.

5. The system of claim 4, wherein the first pressure boost device is selected from a vacuum blower and a pressure boost pump.

6. The system of claim 1, further comprising an exhaust surge tank fluidly connected to the third outlet of the first PSA unit, the exhaust surge tank being operative to cause a pressure reduction at the third outlet of the first PSA unit.

7. The system of claim 6, further comprising a second pressure boost device fluidly connecting the exhaust surge tank to the exhaust, the second pressure boost device being operative to increase a pressure at the exhaust.

8. The system of claim 7, wherein the second pressure boost device is selected from a vacuum blower and a pressure boost pump.

9. The system of claim 1, wherein the gas mixer comprises a biogas blower fluidly connected to the recycling line, to the biogas inlet and to the first PSA unit.

10. The system of claim 1, further comprising: a biogas blower fluidly connected to the recycling line, to the biogas inlet and to the first PSA unit; wherein the gas mixer comprises a manifold fluidly connected to the recycling line, to the biogas inlet and to the biogas blower.

11. The system of claim 1, further comprising:
a water-removal unit adapted to receive the biogas from the biogas inlet and to provide a dry biogas to the gas mixer;
a polishing device adapted to receive the dry biogas from the gas mixer and to remove hydrogen sulfide therefrom; and
a compressor adapted to receive the dry biogas from the polishing device and to supply the dry biogas to an inlet of the first PSA unit.

12. The system of claim 11, wherein the compressor is further adapted to extract remaining water from the dry biogas and to direct the extracted water toward a liquid condensate outlet.

13. The system of claim 12, further comprising a refrigeration unit thermally connected to the water-removal unit and to the compressor, the refrigeration unit being adapted to cause condensation of water contained in the biogas and to cause the condensed water to be directed toward the liquid condensate outlet.

14. The system of claim 1, wherein the surge tank comprises a plurality of cooperating surge tanks.

15. A system for recovering methane from a biogas, comprising:
a first pressure swing adsorption (PSA) unit adapted to:
recover methane from the biogas,
direct a first fraction of the recovered methane from a first outlet of the first PSA unit toward a product gas outlet,
direct a second fraction of the recovered methane from a second outlet of the first PSA unit toward a recycling line, and
direct a remainder of the biogas from a third outlet of the first PSA unit toward an exhaust;
a biogas inlet fluidly connected to a biogas source;
a gas mixer fluidly connected to the biogas inlet, to the recycling line and to the first PSA unit, the gas mixer being adapted to:
form a combination of biogas received at the biogas inlet and of the second fraction of the recovered methane, and
supply the combination to the first PSA unit for methane recovery; and
a surge tank having an inlet fluidly connected to the third outlet of the first PSA unit, the surge tank further having an outlet fluidly connected to the exhaust, the surge tank being operative to cause a pressure reduction at the third outlet of the first PSA unit.

16. The system of claim 15, further comprising a second PSA unit adapted to:
perform an initial recovery of methane from the biogas;
direct the methane resulting from the initial recovery from a first outlet of the second PSA unit toward the recycling line; and
direct a remainder of the biogas from which the methane is initially recovered from a second outlet of the second PSA unit to the exhaust.

17. The system of claim 15, wherein the gas mixer comprises a biogas blower fluidly connected to the recycling line, to the biogas inlet and to the first PSA unit.

18. The system of claim 15, further comprising: a biogas blower fluidly connected to the recycling line, to the biogas inlet and to the first PSA unit; wherein the gas mixer comprises a manifold fluidly connected to the recycling line, to the biogas inlet and to the biogas blower.

19. The system of claim 15, further comprising:
a water-removal unit adapted to receive the biogas from the biogas inlet and to provide a dry biogas to the gas mixer;
a polishing device adapted to receive the dry biogas from the gas mixer and to remove hydrogen sulfide therefrom; and
a compressor adapted to receive the dry biogas from the polishing device and to supply the dry biogas to an inlet of the first PSA unit.

20. The system of claim 19, wherein the compressor is further adapted to extract remaining water from the dry biogas and to direct the extracted water toward a liquid condensate outlet.

* * * * *